(12) United States Patent
Lee et al.

(10) Patent No.: US 8,352,848 B2
(45) Date of Patent: Jan. 8, 2013

(54) METHOD OF GENERATING AND PROCESSING RANGING RESPONSE MESSAGE IN WIRELESS COMMUNICATION SYSTEM

(75) Inventors: Nam Suk Lee, Daejeon (KR); Kyung-Soo Kim, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 439 days.

(21) Appl. No.: 12/734,431

(22) PCT Filed: Jun. 24, 2008

(86) PCT No.: PCT/KR2008/003602
§ 371 (c)(1),
(2), (4) Date: Apr. 30, 2010

(87) PCT Pub. No.: WO2009/057875
PCT Pub. Date: May 7, 2009

(65) Prior Publication Data
US 2010/0299584 A1 Nov. 25, 2010

(30) Foreign Application Priority Data
Nov. 1, 2007 (KR) .......................... 10-2007-0110945

(51) Int. Cl.
*G06F 11/00* (2006.01)
(52) U.S. Cl. ........................................................ 714/807
(58) Field of Classification Search .................... 714/807
See application file for complete search history.

(56) References Cited

U.S. PATENT DOCUMENTS

| | | | |
|---|---|---|---|
| 7,310,303 B2 | 12/2007 | Koo et al. | |
| 7,822,005 B2 * | 10/2010 | Ptasinski et al. | 370/338 |
| 8,045,513 B2 * | 10/2011 | Kim et al. | 370/329 |
| 2003/0120819 A1 * | 6/2003 | Abramson et al. | 709/250 |
| 2005/0058058 A1 | 3/2005 | Cho et al. | |
| 2005/0100102 A1 * | 5/2005 | Gazdzinski et al. | 375/242 |
| 2005/0195791 A1 | 9/2005 | Sung et al. | |
| 2005/0286451 A1 | 12/2005 | Kim et al. | |
| 2006/0209734 A1 | 9/2006 | Son et al. | |
| 2007/0026881 A1 | 2/2007 | Tzavidas et al. | |

(Continued)

FOREIGN PATENT DOCUMENTS

KR    10-2003-0084243    11/2003

(Continued)

OTHER PUBLICATIONS

International Search Report and Written Opinion of International Searching Authority dated Nov. 27, 2008 in relation to International Application No. PCT/KR2008/003602.

(Continued)

*Primary Examiner* — Bryce Bonzo

(57) ABSTRACT

The present invention relates to ranging response message generating and processing methods that can reduce overhead in a wireless portable Internet system. A method of generating a ranging response message according to an exemplary embodiment of the present invention includes: adding to the ranging response message a first field indicating the number of responses for CDMA codes included in the ranging response message and received from terminals; adding to the ranging response message second fields indicating ranging code attributes as the responses for the CDMA codes by a value of the first field; and adding to the ranging response message a plurality of third fields indicating transmission parameter adjustment values corresponding to the individual second fields.

20 Claims, 7 Drawing Sheets

U.S. PATENT DOCUMENTS

2008/0159427 A1 7/2008 Kang et al.

FOREIGN PATENT DOCUMENTS

| KR | 10-2005-0014319 | 2/2005 |
| KR | 10-2005-0089697 | 9/2005 |
| KR | 10-2005-0089709 | 9/2005 |
| KR | 10-2008-0063594 | 7/2008 |

OTHER PUBLICATIONS

Hang Zhang, et al.: "Initial Ranging Overhead Reduction", IEEE 802.16 Broadband Wireless Access Working Group, IEEE C802.16e-04/225, Jun. 25, 2004, <http://ieee802.org/16>.

* cited by examiner

METHOD OF GENERATING AND PROCESSING RANGING RESPONSE MESSAGE IN WIRELESS COMMUNICATION SYSTEM

CROSS-REFERENCE TO RELATED APPLICATIONS)

The present application is related to International Application No. PCT/KR2008/003602 filed Jun. 24, 2008 entitled "METHOD OF GENERATING AND PROCESSING RANGING RESPONSE MESSAGE IN WIRELESS COMMUNICATION SYSTEM" which claims priority to Korean Patent Application No. 10-2007-0110945 filed Nov. 1, 2007. International Application No. PCT/KR2008/003602 is assigned to the assignee of the present application and is hereby incorporated by reference into the present disclosure as if fully set forth herein. The present application hereby claims priority under 35 U.S.C. §119(a) to International Patent Application No. PCT/KR2008/003602 and Korean Patent Application No. 10-2007-0110945.

TECHNICAL FIELD

The present invention relates to ranging response message generating and processing methods, and more particularly, to ranging response message generating and processing methods that can reduce overhead in a wireless portable Internet system.

BACKGROUND ART

In a wireless Internet system, terminals transmit CDMA codes for ranging to a base station, and the base station transmits a ranging response message (hereinafter referred to as "RNG_RSP" message) to the terminals.

In the above ranging procedure, with respect to the CDMA codes that are competitively transmitted from the terminals, the base station broadcasts an RNG_RSP message as a response to the successfully received CDMA code to all of the terminals.

FIG. 1 is a diagram illustrating a CDMA code ranging procedure according to the related art.

As shown in FIG. 1, if a plurality of terminals competitively transmit CDMA codes to an uplink of an n-th frame, a base station receives the CDMA codes and calculates power and timing adjustment values for each of the CDMA codes received without a conflict. When the number of CDMA codes received from the plurality of terminals is n and the n codes are received by the base station without a conflict, the base station broadcasts n RNG_RSP messages as responses for the individual CDMA codes. Each of the terminals receives all of the RNG_RSP messages that are broadcast from the base station, and compares a CDMA code, a frame number, and subchannel and symbol numbers transmitted by each terminal and values included in the RNG_RSP messages, and selects an RNG_RSP message transmitted to each terminal.

FIG. 2 is a diagram illustrating a ranging response message according to the related art.

As shown in FIG. 2, a ranging response message according to the related art includes response information for one CDMA code. That is, with respect to each of the CDMA codes received without a conflict, the base station transmits a ranging response message.

A field of ranging code attributes that are included in the ranging response message includes a CDMA code, a frame number, and subchannel and symbol numbers that are received.

If each terminal receives a ranging response message, each terminal compares information included in the field of ranging code attributes of the ranging response message and information of the CDMA code transmitted by each terminal and determines whether the two pieces of information are matched with each other. If the two pieces of information are matched with each other, each terminal uses the information included in the received ranging response message to adjust uplink transmission parameters, such as transmission power, timing, and frequency offset. Meanwhile, if the information included in the field of the ranging code attributes is not matched with the information of the CDMA code transmitted by each terminal, each terminal ignores the received ranging response message.

Data is exchanged between the base station and the terminals in a form of a packet data unit (PDU). The base station appends a header and cyclic redundancy checking (CRC) to the ranging response message in order to construct a PDU. As shown in FIG. 2, a header of 6 bytes and CRC of 4 bytes are respectively appended to the front and rear of the ranging response message for the CDMA code so as to construct one PDU, and the ranging response message is transmitted in a form of the PDU. At this time, since a capacity of the ranging response message for the CDMA code is a maximum of 26 bytes, a PDU overhead ratio that is needed to transmit the ranging response message is very large at 10/36. This causes a problem in that the waste of downlink wireless resources becomes severe when the number of CDMA codes received for each frame and the number of ranging response messages broadcast from the base station are increased.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method of generating a ranging response message, having advantages of reducing a PDU overhead ratio needed to transmit a ranging response message and minimizing waste of downlink resources.

Technical Solution

An exemplary embodiment of the present invention provides a method of generating a ranging response message in a base station of a mobile communication system. The method includes adding to the ranging response message a first field indicating the number of responses for CDMA codes included in the ranging response message and received from terminals; adding to the ranging response message second fields indicating ranging code attributes as the responses for the CDMA codes by a value of the first field; and adding to the ranging response message a plurality of third fields indicating transmission parameter adjustment values corresponding to the individual second fields.

Another exemplary embodiment of the present invention provides a method of processing a ranging response message in a terminal of a mobile communication system. The method includes: receiving the ranging response message from a base station; if the number of responses for CDMA codes included in the ranging response message is not 0, determining whether the terminal is in a first status in which the terminal transmits the CDMA codes to the base station and waits for a response for the CDMA codes; and if the terminal is in the first status, searching a first field from among fields indicating attributes of a plurality of ranging codes included in the ranging response message, the first field indicating an attribute of a ranging code whose CDMA code value is matched with a CDMA code value transmitted from the terminal to the base station.

Advantageous Effects

According to the embodiments of the present invention, responses for a plurality of CDMA codes are transmitted using one ranging response message, which minimizes waste of downlink resources and simplifies a process procedure of the ranging response message performed by a terminal.

MODE FOR THE INVENTION

Figure 1:
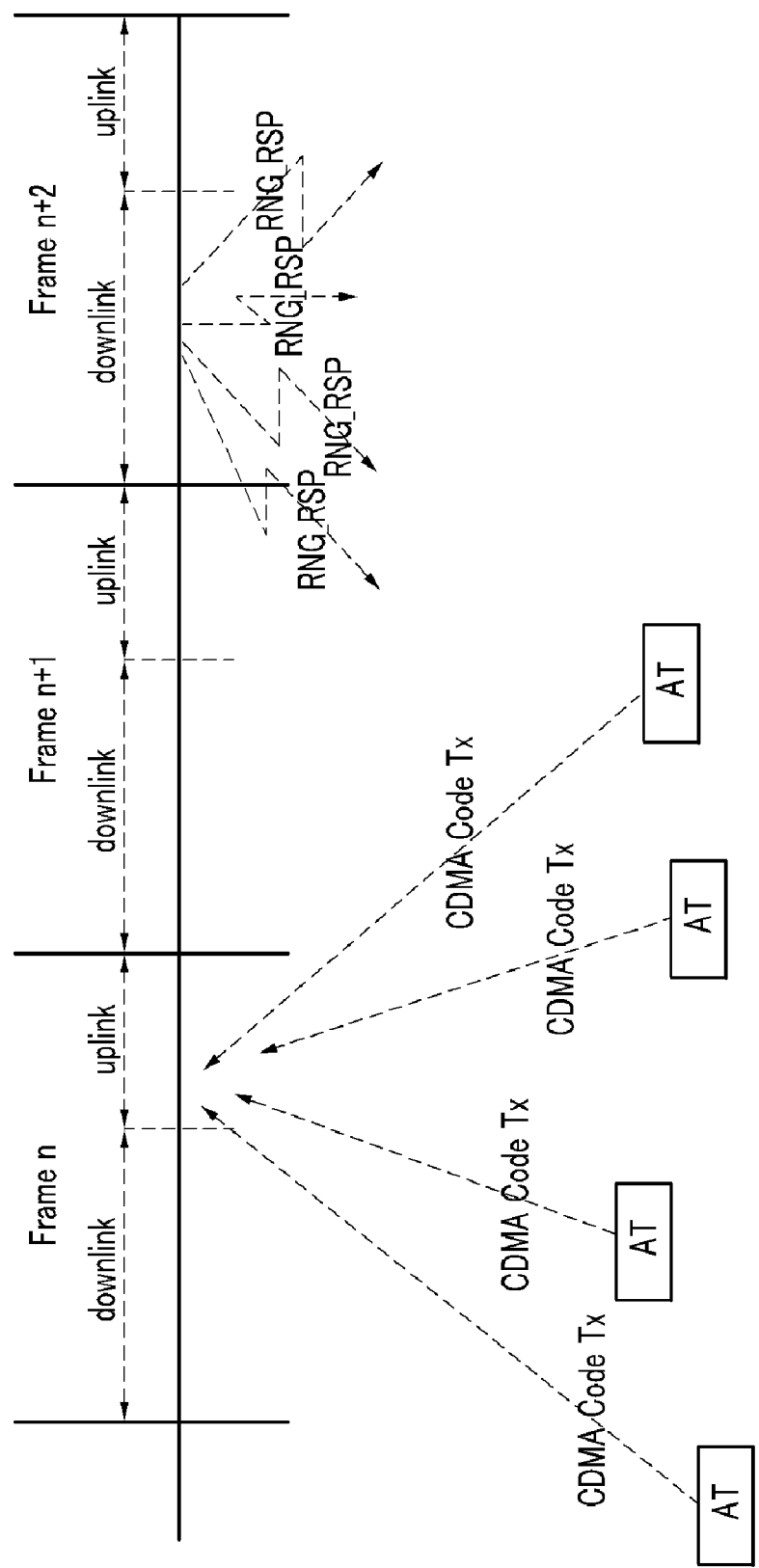
FIG. 1 is a diagram illustrating a CDMA code ranging procedure according to the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "unit" or "-or" used herein means one unit that processes at least one function or operation, and may be implemented by hardware or software, or a combination thereof.

First, a ranging procedure for each function of a wireless portable Internet system will be described.

Ranging of a wireless portable Internet system is a procedure that is performed to adjust transmission power, timing, and a frequency corresponding to uplink transmission parameters in a terminal. The ranging of the wireless portable Internet system may be classified into initial ranging (IR), handoff ranging (HR), periodic ranging (PR), and bandwidth request ranging (BR).

Figure 3:
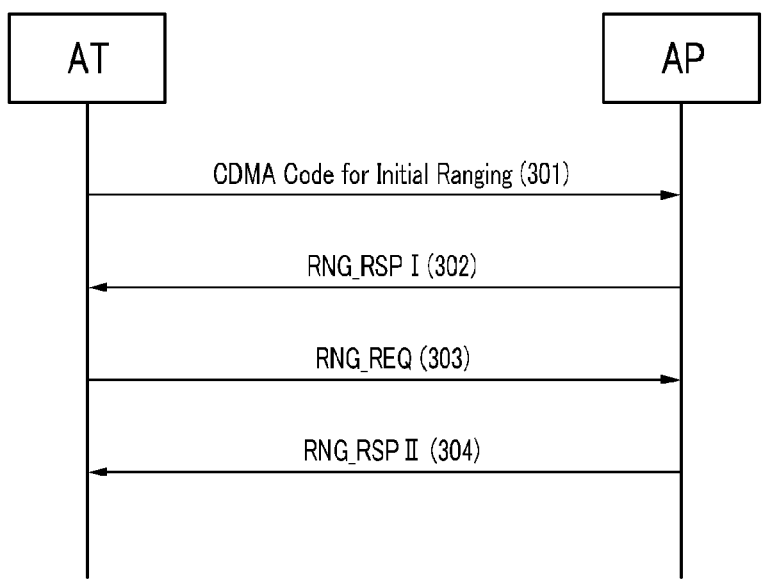
FIG. 3 is a diagram illustrating an initial ranging procedure of a wireless portable Internet system.

The initial ranging is used when a terminal adjusts uplink transmission parameters and performs an initial access procedure with a base station at the time of initial access. FIG. 3 is a diagram illustrating an initial ranging procedure of a wireless portable Internet system. As shown in FIG. 3, each of the terminals selects an arbitrary subchannel and symbol during an initial uplink and competitively transmits an arbitrary CDMA code for ranging to a base station (301). If the base station broadcasts a first ranging response message as a response for the CDMA code (302), each of the terminals receives the first ranging response message and determines whether the first ranging response message is a message transmitted to each terminal. As a determined result, if the first ranging response message is the message transmitted to each terminal, each terminal refers to the first ranging response message to adjust uplink transmission parameters and transmits a ranging request (RNG_REQ) message including a MAC address of each terminal for initial access (303). If the base station receives the ranging request message, the base station allocates a basic connection identifier (hereinafter referred to as "basic CID") and a primary connection identifier (hereinafter referred to as "primary CID") to each terminal and broadcasts a second ranging response message including the basic CID and primary CID (304).

Figure 4:
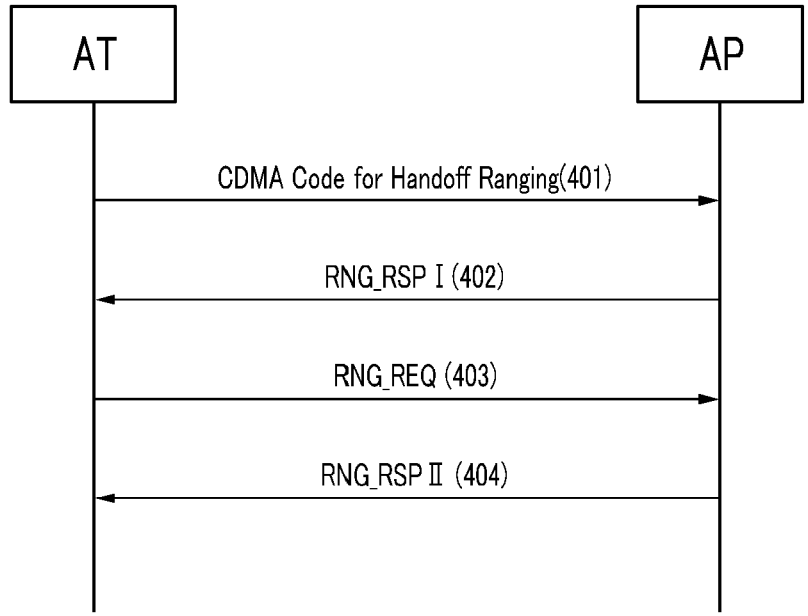
FIG. 4 is a diagram illustrating a handoff ranging procedure of a wireless portable Internet system.

The handoff ranging is used when the terminal adjusts uplink transmission parameters and performs a handoff access procedure with the base station at the time of handoff. FIG. 4 is a diagram illustrating a handoff ranging procedure of a wireless portable Internet system. As shown in FIG. 4, each of the terminals competitively transmits an arbitrary CDMA code for handoff ranging to the base station (401). If the base station broadcasts the first ranging response message as a response for the CDMA code (402), each of the terminals receives the first ranging response message and determines whether the first ranging response message is a message transmitted to each terminal. As a determined result, if the first ranging response message is a message transmitted to each terminal, each terminal refers to the first ranging response message to adjust uplink transmission parameters, and transmits a ranging request message including a MAC address of each terminal for handoff access (403). If the base station receives the ranging request message, the base station allocates a basic CID and a primary CID to each terminal and broadcasts a second ranging response message including the basic CID and the primary CID (404).

Figure 5:
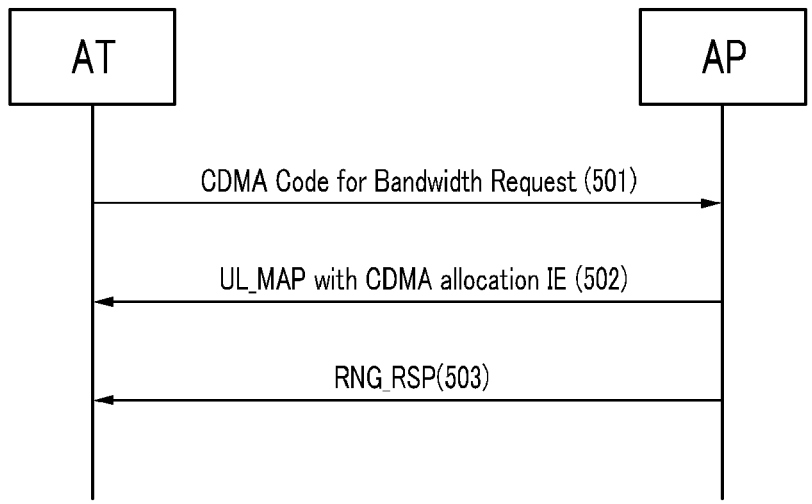
FIG. 5 is a diagram illustrating a bandwidth request ranging procedure of a wireless portable Internet system.

The bandwidth request ranging is a procedure performed in order that, when data that needs to be transmitted from a terminal to a base station is generated, the terminal is allocated with uplink resources for data transmission from the base station. FIG. 5 is a diagram illustrating a bandwidth request ranging procedure of a wireless portable Internet system. As shown in FIG. 5, if uplink data is generated, the terminal selects an uplink subchannel and symbol to transmit an arbitrary CDMA code (501). If the base station receives a CDMA code for a bandwidth request, the base station allocates an uplink resource and broadcasts a UL_MAP with a CDMA allocation IE that includes the allocated information (502). Then, in order to selectively adjust uplink transmission parameters of the terminal, the base station broadcasts a ranging response message (503).

Figure 6:
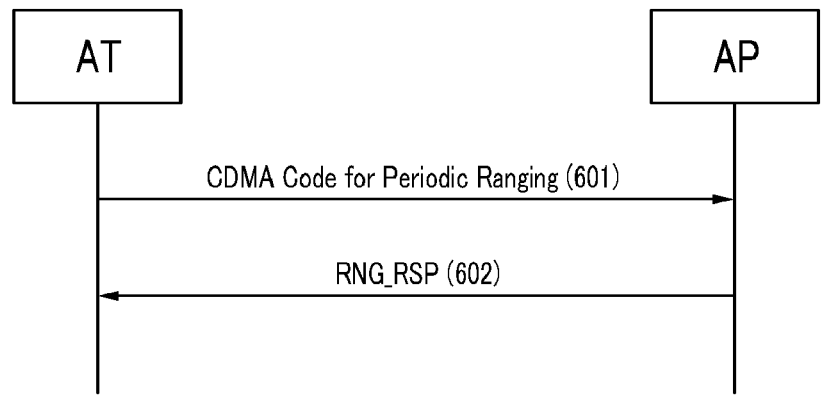
FIG. 6 is a diagram illustrating a periodic ranging procedure of a wireless portable Internet system.

The periodic ranging is a procedure performed in order for a terminal to periodically adjust transmission power, timing, and frequency offset serving as uplink transmission parameters. FIG. 6 is a diagram illustrating a periodical ranging procedure of a wireless portable Internet system. As shown in FIG. 6, a terminal transmits to a base station a CDMA code for periodic ranging at a predetermined period interval (601). The base station transmits a ranging response message including adjustment values of the transmission parameters to the terminal (602).

Next, a method of generating a ranging response message in a mobile communication system according to an exemplary embodiment of the present invention will be described with reference to FIGS. 7 to 9.

In a portable Internet system, the ranging response message may be classified into two kinds of ranging response messages. One is a ranging response message for a CDMA code and the other is a ranging response message for a ranging request. The exemplary embodiment of the present invention suggests a method that is capable of efficiently generating a ranging response message for a CDMA code without affecting a ranging response message for a ranging request.

Figure 7:
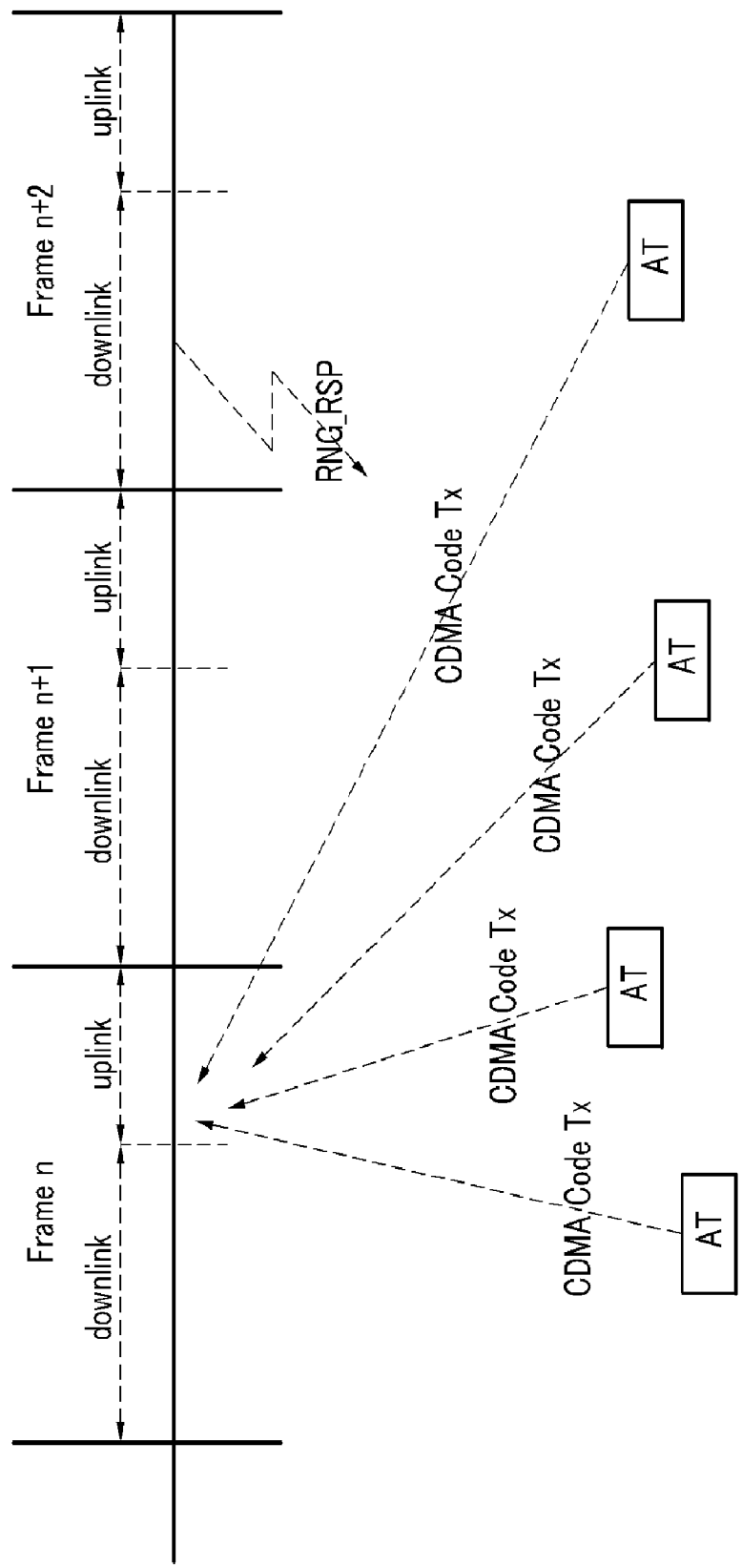
FIG. 7 is a diagram illustrating a CDMA code ranging procedure according to an exemplary embodiment of the present invention.

FIG. 7 is a diagram illustrating a CDMA code ranging procedure according to an exemplary embodiment of the present invention.

As shown in FIG. 7, when a plurality of terminals transmit CDMA codes for ranging during an n-th frame, respectively, the base station generates one ranging response message including ranging code attribute values and transmission parameter adjustment values for the plurality of CDMA codes received without a conflict, and transmits the ranging response message.

Figure 8:
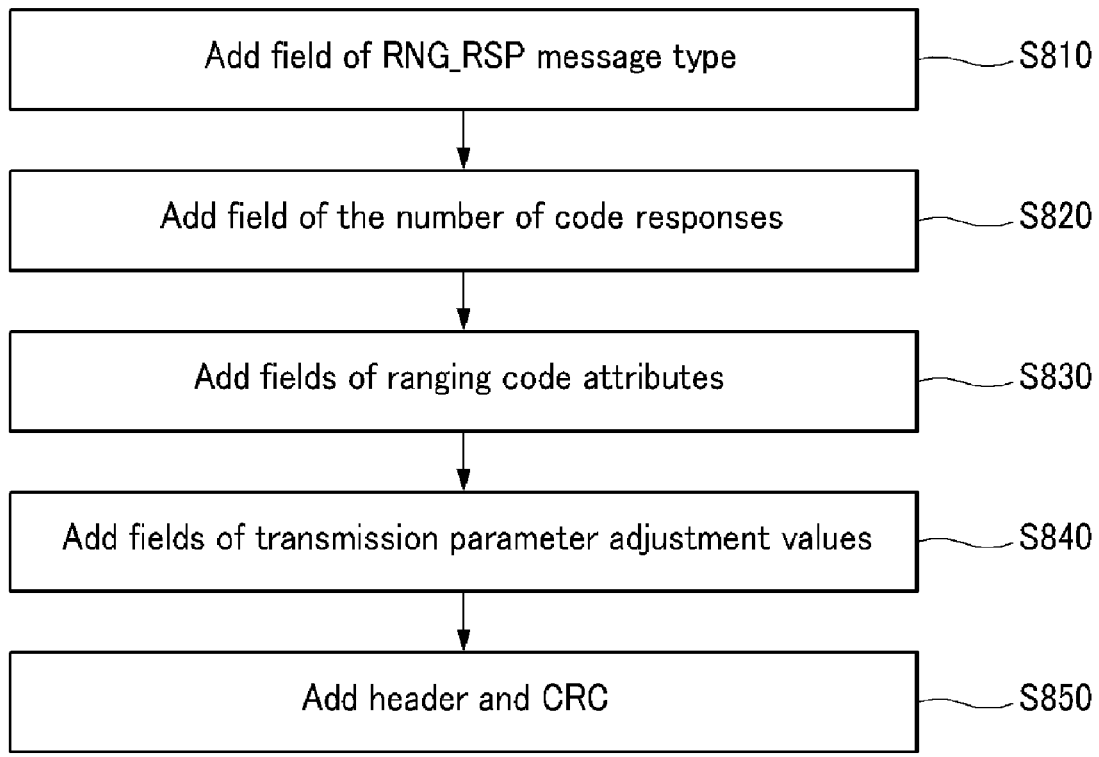
FIG. 8 is a flowchart illustrating a method of generating a ranging response message in a mobile communication system according to an exemplary embodiment of the present invention.
Figure 9:
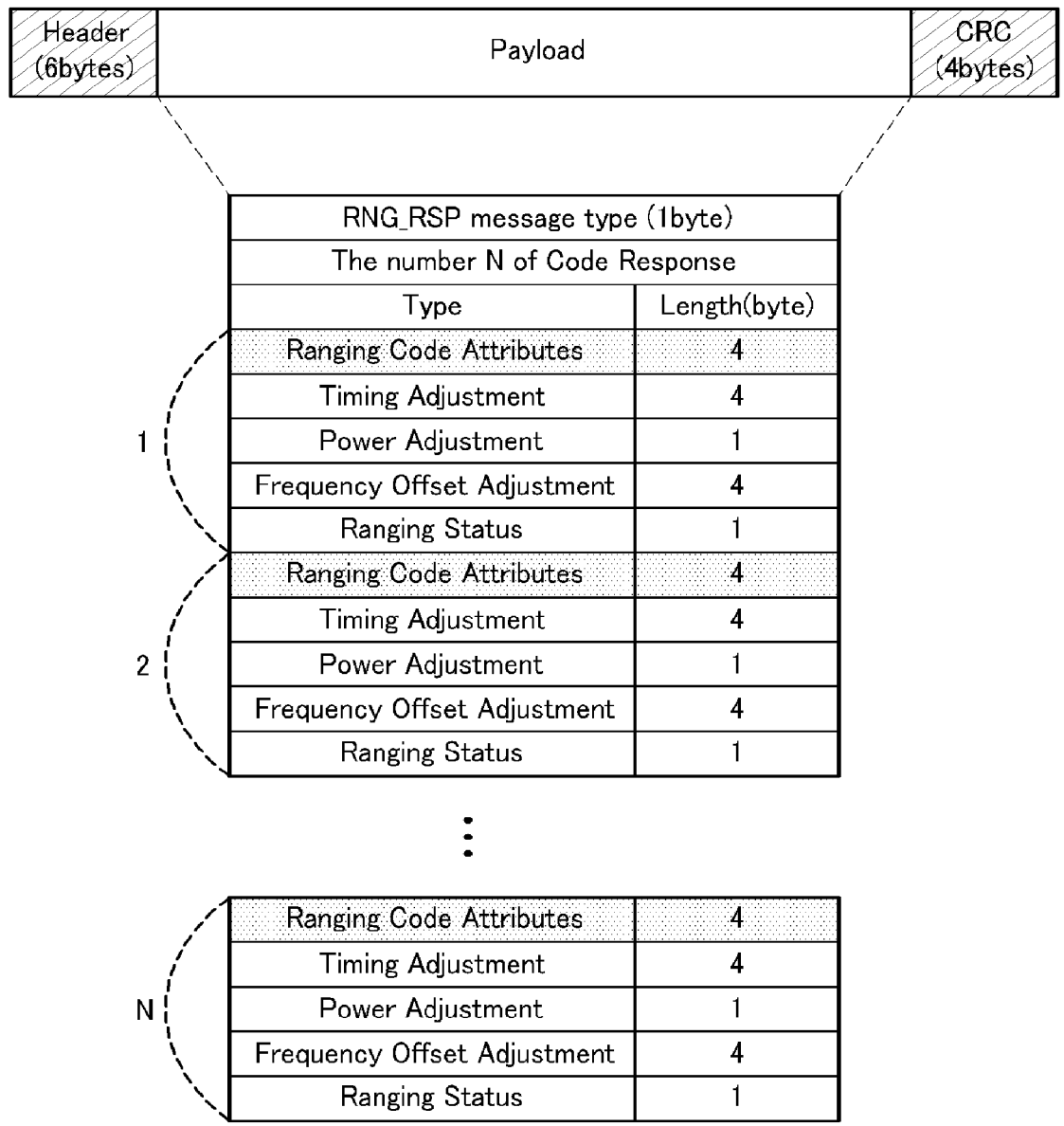
FIG. 9 is a diagram illustrating a structure of a ranging response message used in a mobile communication system according to an exemplary embodiment of the present invention.

FIG. 8 is a flowchart illustrating a method of generating a ranging response message in a mobile communication system according to an exemplary embodiment of the present invention, and FIG. 9 is a diagram illustrating a structure of a ranging response message in a mobile communication system according to an exemplary embodiment of the present invention.

First, the base station adds a field of a ranging response message type (hereinafter referred to as "RNG_RSP message type") of 1 byte to the ranging response message (S810). The field of the RNG_RSP message type indicates which message a corresponding message among various kinds of messages exchanged between the base station and the terminal is.

The base station adds a field of the number of code responses to the ranging response message (S820).

Figure 2:
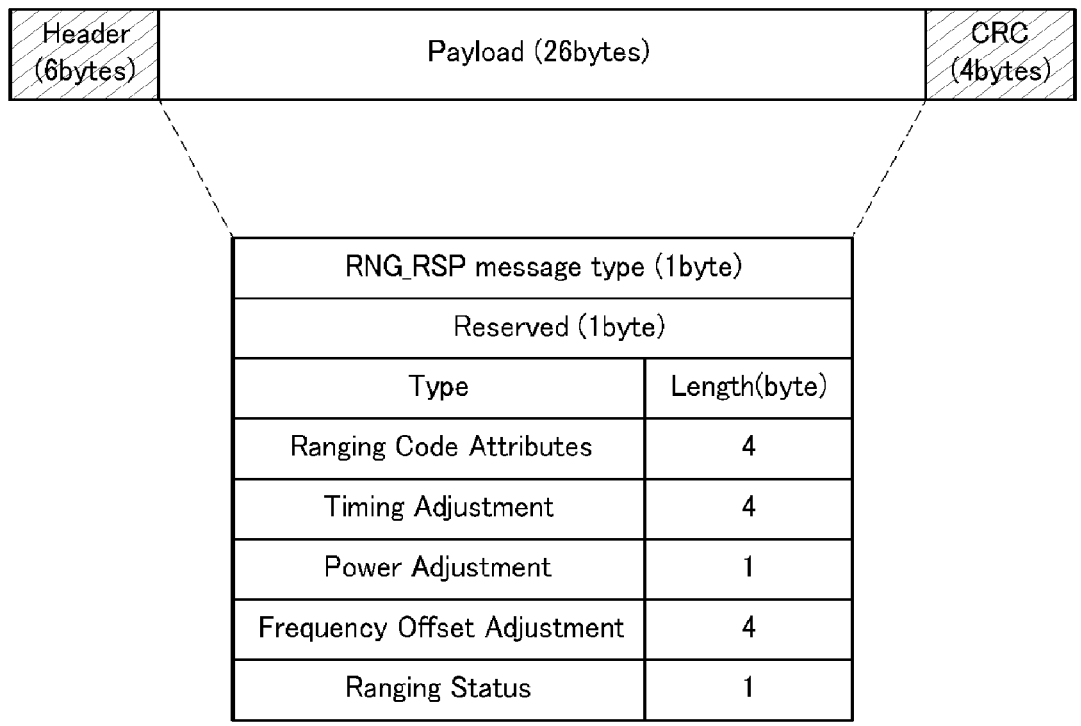
FIG. 2 is a diagram illustrating a ranging response message according to the related art.

Referring to FIG. 2, in the ranging response message according to the related art, a reserved field of 1 byte exists in the back of the field of the ranging response message type. As shown in FIG. 9, in the ranging response message according to the exemplary embodiment of the present invention, the reserved field is used as the field of the number of code responses. The field of the number of code responses indicates the number of responses for CDMA codes in the ranging response message. If the value of the field of the number of code responses is 0, it indicates that the ranging response message is a response for a ranging request. If the value of the field of the number of code responses is larger than 0, it indicates that the ranging response message is a response for CDMA code ranging. In this case, the value of the field of the number of code responses indicates the number of responses for CDMA codes included in the ranging response message.

As shown in FIG. 9, when the value of the field of the number of code responses is N, the ranging response message includes N fields of ranging code attributes and N fields of transmission parameter adjustment values.

The base station adds the N fields of ranging code attributes to the ranging response message (S830). At this time, N indicates the value of the field of the number of code responses and may become the number of CDMA codes that are received by the base station without a conflict. The fields of ranging code attributes include the CDMA codes, frame numbers, and subchannel and symbol numbers that are received.

The base station adds N fields of transmission parameter adjustment values to the ranging response message (S840).

The fields of the transmission parameter adjustment values include a timing adjustment field, a power adjustment field, and a frequency offset adjustment field.

The base station adds a ranging status field to the ranging response message (S850). If the transmission parameter adjustment value is large and not within a predetermined range defined by the base station, the ranging status is set to continue and the ranging response message is transmitted. Then, the terminal that has received the ranging response message where the ranging status is set to continue transmits additional CDMA codes to the base station, such that the transmission parameter adjustment value is precisely adjusted. If the transmission parameter adjustment value is within the predetermined range defined by the base station, the ranging status is set to success and the ranging response message is transmitted. The terminal that has received the ranging response message where the ranging status is set to success does not transmit additional CDMA codes.

The base station adds a header and cyclic redundancy checking (CRC) to the ranging response message (S850). As shown in FIG. 9, a header of 6 bytes is appended to the front of the ranging response message for the CDMA code and CRC of 4 bytes is appended to the rear of the ranging response message, thereby configuring one PDU. The PDU is transmitted.

In the related art, a ranging response message is constructed for each of CDMA codes and thus an overhead ratio is 10/36. However, if using the method of generating a ranging response message according to the exemplary embodiment of the present invention, it is possible to considerably reduce the overhead ratio. The base station receives the N CDMA codes from the terminals without a conflict, and constructs one ranging response message and transmits the ranging response message. In this case, the PDU overhead ratio becomes 10/(6+2+N*24+4). Downlink resources of N*36 are needed in the related art, but downlink resources of 12+N*24 are needed in the present invention. Thus, it is possible to considerably save the system resources. That is, when N increases, the PDU overhead ratio decreases.

Figure 10:
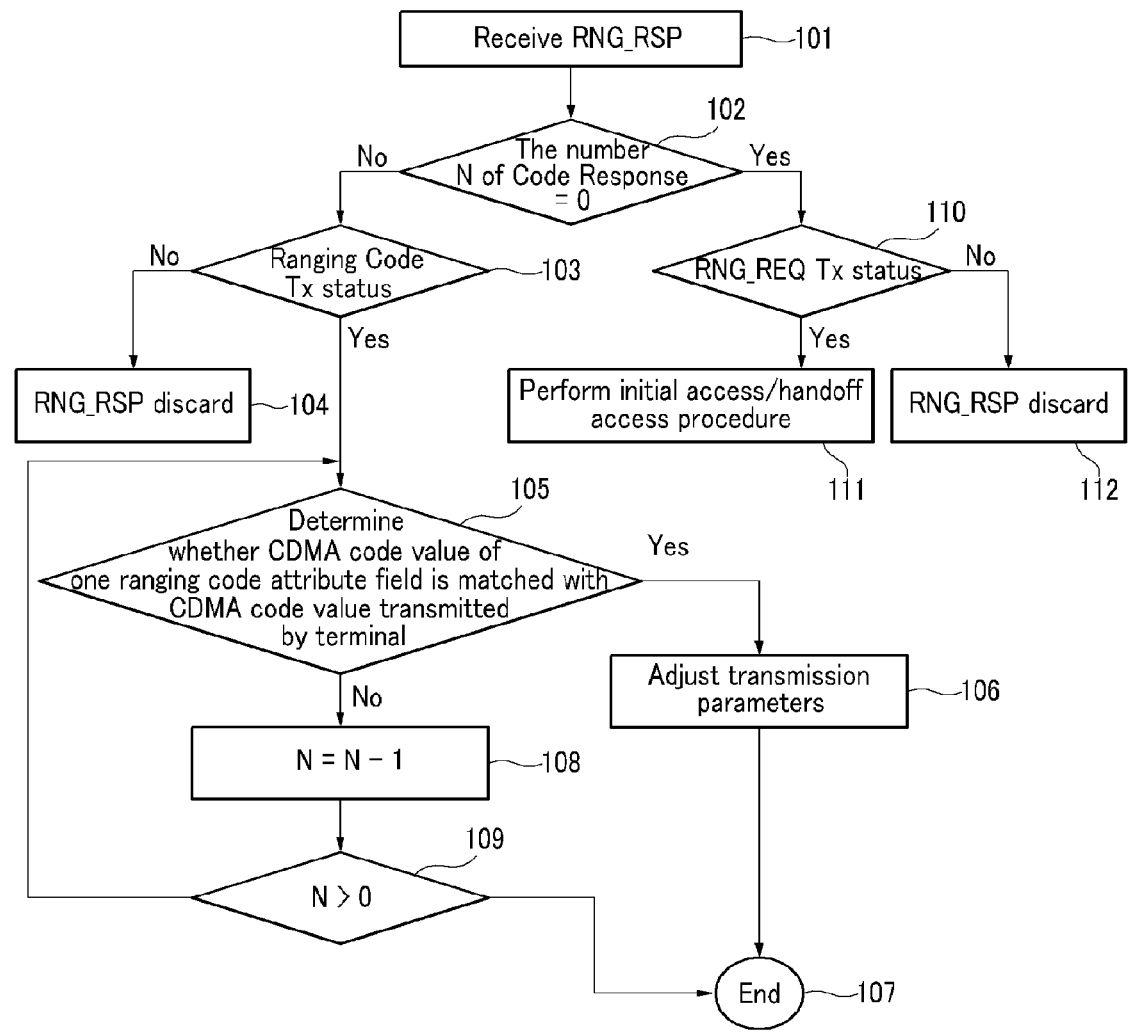
FIG. 10 is a flowchart illustrating a method of processing a range response message in a terminal according to an exemplary embodiment of the present invention.

Hereinafter, a method of processing a ranging response message in a terminal according to an exemplary embodiment of the present invention will be described with reference to FIG. 10. FIG. 10 is a flowchart illustrating a method of processing a ranging response message in a terminal according to an exemplary embodiment of the present invention.

If the terminal receives a ranging response message from the base station (101), the terminal checks the field of the number of code responses (102). If the value of the field of the number of code responses is 0, the received ranging response message is a ranging response for a ranging request message. Thus, it is determined whether the terminal transmits the ranging request message and waits for a response for the ranging request message (110). If the terminal waits for a response for the ranging request message, the terminal processes parameters included in the received ranging response message and performs an initial access or handoff procedure (111). Meanwhile, if the terminal does not wait for a response for the ranging request message, the terminal ignores the received ranging response message (112).

If the value of the field of the number of code responses is not 0, the received ranging response message is a response for CDMA codes. Thus, it is determined whether the terminal transmits the CDMA codes and waits for a ranging response for the CDMA codes (103). If the terminal does not wait for the ranging response for the CDMA codes, the terminal ignores the received ranging response message (104).

Meanwhile, if the terminal waits for a ranging response for the CDMA codes, the terminal compares a CDMA code value of one ranging code attribute field and a CDMA code value transmitted by the terminal (105). If the CDMA code value of one ranging code attribute field is matched with the CDMA code value transmitted by the terminal, the terminal refers to the field of transmission parameter adjustment values corresponding to one ranging code attribute filed to adjust the transmission parameters (106).

If the CDMA code value of one ranging code attribute field is not matched with the CDMA code value transmitted by the terminal, the terminal compares a CDMA code value of another ranging code attribute field and the CDMA code value transmitted by the terminal (108 and 109). As such, the terminal compares CDMA code values of all ranging code attribute fields and the CDMA code value transmitted by the terminal until a CDMA code value matched with the CDMA code value transmitted by the terminal is searched.

In the method of processing a ranging response message in a terminal according to the exemplary embodiment of the present invention, the statuses of the terminal are classified and the ranging response message can be quickly processed. Since a plurality of responses for a plurality of CDMA codes are included in one ranging response message, process complexity can be reduced, as compared with the case of receiving and processing a plurality of ranging response messages.

The exemplary embodiment of the present invention that has been described above may be implemented by not only an apparatus and a method but also a program capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of generating a ranging response message in a base station, the method comprising:
adding to the ranging response message a first field indicating the number of responses for terminal unique random codes included in the ranging response message and received from terminals;
adding to the ranging response message second fields indicating ranging code attributes as the responses for the terminal unique random codes by a value of the first field; and
adding to the ranging response message a plurality of third fields indicating transmission parameter adjustment values corresponding to the individual second fields.

2. The method of claim 1, wherein, if the value of the first field is 0, the ranging response message is a response for a ranging request message from the terminals.

3. The method of claim 1, wherein the second fields include information that indicate terminal unique random codes, frame numbers, and subchannel and symbol numbers that are received from the terminals.

4. The method of claim 1, wherein the third fields include a timing adjustment field, a power adjustment field, and a frequency offset adjustment field.

5. The method of claim 1, further comprising:
adding a header and cyclic redundancy checking (CRC) to the ranging response message.

6. The method of claim 1, further comprising:
adding a fourth field indicating a ranging response message type to the ranging response message.

7. A method of processing a ranging response message in a terminal of a mobile communication system, the method comprising:
receiving the ranging response message from a base station;
if the number of responses for terminal unique random codes included in the ranging response message is not 0, determining whether the terminal is in a first status in which the terminal transmits the terminal unique random codes to the base station and waits for a response for the terminal unique random codes; and
if the terminal is in the first status, searching a first field from among fields indicating attributes of a plurality of ranging codes included in the ranging response message, the first field indicating an attribute of a ranging code whose terminal unique random code value is matched with a terminal unique random code value transmitted from the terminal to the base station.

8. The method of claim 7, further comprising:
referring to a plurality of second fields indicating transmission parameter adjustment values corresponding to the first field to adjust transmission parameters.

9. The method of claim 8, wherein the second fields include a timing adjustment field, a power adjustment field, and a frequency offset adjustment field.

10. The method of claim 7, further comprising:
if the number of responses for the terminal unique random codes included in the ranging response message is 0, determining whether the terminal is in a second status in which the terminal transmits a ranging request message to the base station and waits for a response for the ranging request message; and
if the terminal is in the second status, performing an initial access procedure using the ranging response message.

11. A base station capable of generating a ranging response message, the base station configured to:
add, to the ranging response message, a first field indicating the number of responses for terminal unique random codes included in the ranging response message and received from a plurality of terminals;
add, to the ranging response message, second fields indicating ranging code attributes as the responses for the terminal unique random codes by a value of the first field; and add, to the ranging response message, a plurality of third fields indicating transmission parameter adjustment values corresponding to the individual second fields.

12. The base station of claim 11, wherein, if the value of the first field is 0, the ranging response message is a response for a ranging request message from the terminals.

13. The base station of claim 11, wherein the second fields include information that indicate terminal unique random codes, frame numbers, and subchannel and symbol numbers that are received from the plurality of terminals.

14. The base station of claim 11, wherein the third fields include a timing adjustment field, a power adjustment field, and a frequency offset adjustment field.

15. The base station of claim 11, wherein the base station further is configured to add a header and perform cyclic redundancy checking (CRC) to the ranging response message.

16. The base station of claim 11, wherein the base station further is configured to add a fourth field indicating a ranging response message type to the ranging response message.

17. For use in a mobile communication system, a portable terminal capable of processing a ranging response message, the portable terminal configured to:
   receive the ranging response message from a base station;
   if the number of responses for terminal unique random codes included in the ranging response message is not 0, determine whether the terminal is in a first status in which the terminal transmits the terminal unique random codes to the base station and waits for a response for the terminal unique random codes; and
   if the terminal is in the first status, search a first field from among fields indicating attributes of a plurality of ranging codes included in the ranging response message, the first field indicating an attribute of a ranging code whose terminal unique random code value is matched with a terminal unique random code value transmitted from the terminal to the base station.

18. The portable terminal of claim 17, wherein the portable terminal further is configured to refer to a plurality of second fields indicating transmission parameter adjustment values corresponding to the first field to adjust transmission parameters.

19. The portable terminal of claim 18, wherein the second fields include a timing adjustment field, a power adjustment field, and a frequency offset adjustment field.

20. The portable terminal of claim 17, wherein the portable terminal further is configured to:
   if the number of responses for the terminal unique random codes included in the ranging response message is 0, determine whether the terminal is in a second status in which the terminal transmits a ranging request message to the base station and waits for a response for the ranging request message; and
   if the terminal is in the second status, perform an initial access procedure using the ranging response message.

\* \* \* \* \*